March 2, 1965  C. D. FLANAGAN  3,172,011
ELECTRICAL CIRCUIT CONTROL APPARATUS
Original Filed March 18, 1959  2 Sheets-Sheet 1

Charles D. Flanagan,
Inventor.
Koenig Pope Senniger and Powers,
Attorneys.

March 2, 1965     C. D. FLANAGAN     3,172,011
ELECTRICAL CIRCUIT CONTROL APPARATUS
Original Filed March 18, 1959
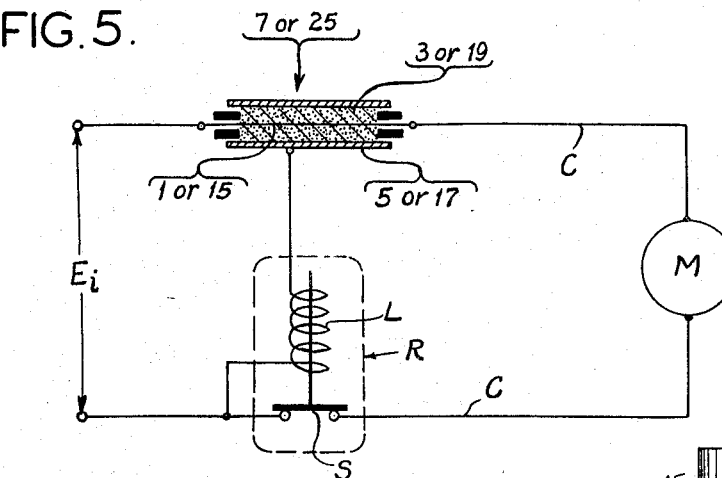
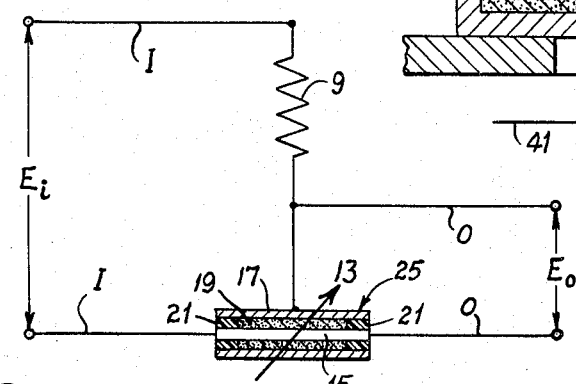
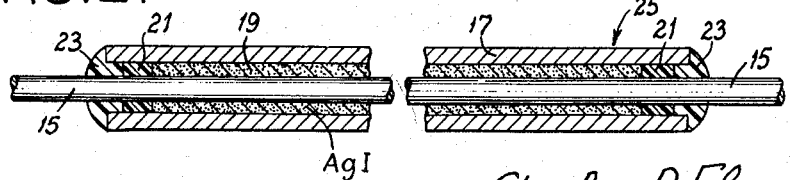

United States Patent Office 3,172,011
Patented Mar. 2, 1965

3,172,011
ELECTRICAL CIRCUIT CONTROL APPARATUS
Charles D. Flanagan, Attleboro, Mass., assignor to Texas Instruments Incorporated, Dallas, Tex., a corporation of Delaware
Original application Mar. 18, 1959, Ser. No. 800,314, now Patent No. 3,009,127, dated Nov. 14, 1961. Divided and this application June 9, 1961, Ser. No. 115,966
5 Claims. (Cl. 317—41)

This invention relates to temperature-sensitive electrical circuit control apparatus, and with regard to certain more specific features, to such apparatus including elements having certain nonlinear temperature-resistance characteristics.

This application is a divisional of my copending application Serial No. 800,314, filed March 18, 1959, now Patent No. 3,009,127, granted November 14, 1961, for Temperature-Sensitive Electrical Control Element.

Among the several objects of the invention may be noted the provision of temperature-sensitive electrical circuit control apparatus including elements having sharply nonlinear temperature-resistance characteristics over certain narrow temperature ranges; the provision of apparatus of the class described wherein the nonlinearity is characterized by rapid change in resistance over a narrow range of temperature; the provision of such apparatus wherein the stated resistance change is of the order of at least one magnitude; and the provision of apparatus of this type which is incorporated in electrical circuits to provide effective means for control of various classes of apparatus such as relays, switches, thermostats, indicators and the like. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is a schematic cross section illustrating one form of an element of electrical circuit control apparatus of the present invention;

FIG. 2 is a schematic cross section illustrating a second form of an element component of this invention;

FIG. 4 is a wiring diagram illustrating certain electrical arrangements for obtaining the graph of FIG. 3;

FIG. 5 is a wiring diagram illustrating application of either form of the elements shown in FIGS. 1 and 2 to a circuit to be controlled; and, FIG. 6 is a cross section illustrating a third form of the element which constitutes part of the invention.

Corresponding reference characters indicate corresponding parts throughout the several views of the drawings.

Figure 1:
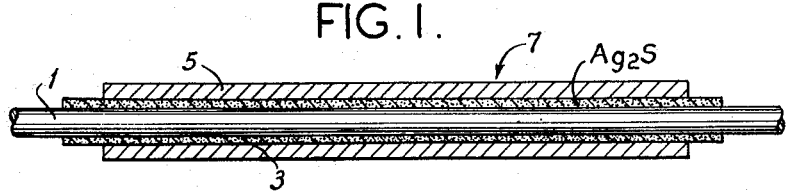

Referring now more particularly to FIG. 1, there is shown at numeral 1 a conductive electrode constituted, for example, by a length of silver wire forming a core. This electrode is provided with a coating 3 of a semiconductor such as silver sulfide ($Ag_2S$), which may be formed by placing the silver wire in an atmosphere of hydrogen sulfide ($H_2S$) for such a time as to allow a desired thickness (several hundredths of an inch, for example) to be obtained of the silver sulfide. The length of the coating may be an inch or so. On the outside of the coating 3 is located a second sleeve-like electrode 5, constituted by a suitable layer of conductive material such as, for example, copper, which may be applied to desired thickness in any conventional manner, as, for example, by a metalizing spray, to a depth of about several hundredths of an inch. The silver sulfide coating 3 constitutes a semiconductor between the electrodes 1 and 5. The entire device shown in FIG. 1 will hereinafter be referred to as a temperature-sensitive capsule or unit 7.

In FIG. 2 is shown another form of the invention in which, among other differences, silver iodide (AgI) constitutes the semiconductor element. In this case a copper wire core 15 serves as one electrode. This is coaxially arranged within a copper tube or sleeve 17 with space therebetween, the tube 17 serving as a second electrode. The diameter of the wire 15 may be, for example, .020 of an inch and the inside diameter of the tube 17, for example, .062 of an inch. The space between the wire 15 and tube 17 is packed under some pressure with powdered silver iodide 19 as the semiconductor. Insulating spacer plugs 21 are employed at the ends of the tube 17 and hold the powdered iodide in packed position. The ends of the tube 17 and spacers 21 may be sealed over with a suitable material such as an epoxy resin 23. The length of the wire 15 which is surrounded by the powder 19 may be on the order of 1.2 inches or so. The entire capsule or unit of FIG. 2 is numbered 25.

Figure 3:
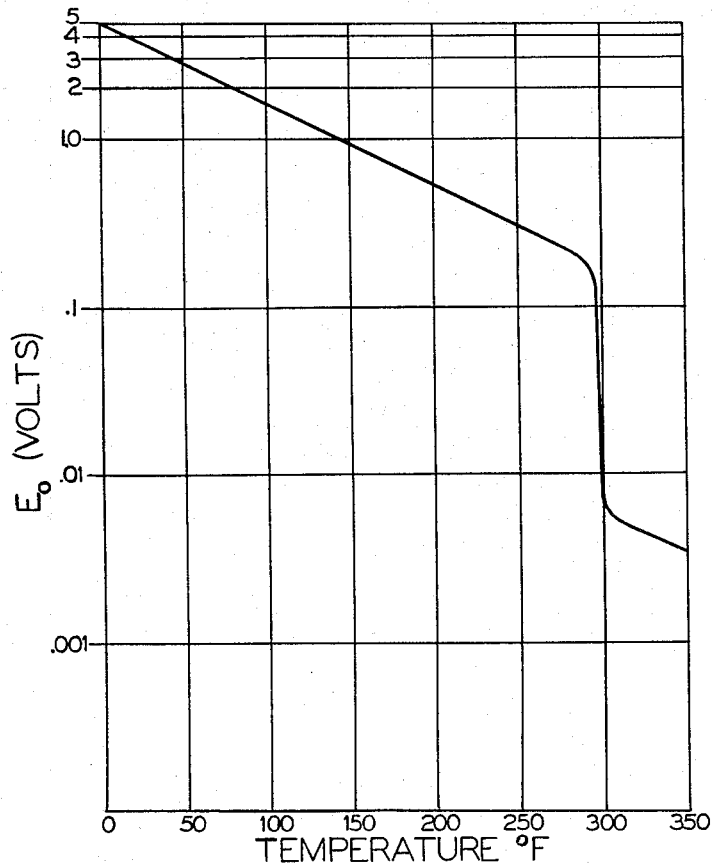
FIG. 3 is a graph illustrating typical characteristics of the element shown in FIG. 2.

The unit 25 of FIG. 2 has the temperature-voltage characteristics plotted on a logarithmic voltage scale in FIG. 3. The plot is obtained from an electrical circuit such as shown in FIG. 4, in which a fixed resistance 9 is connected to wire 15 through elements 17 and 19. An A.C. voltage input circuit I is connected to wire 15 and resistance 9 to supply voltage across elements 9, 17 and 19. A constant voltage $E_i$ is applied to circuit I. An output circuit O is connected across the electrodes 17 and 15 and the output voltage $E_o$ is measured. The arrow 13 indicates the variable-resistance effect of the unit 25 in response to its temperature changes. The temperature of unit 25 is varied as desired for test purposes, as by placing the unit in a variable-temperature oven or the like.

FIG. 3 plots the voltage output $E_o$ on a logarithmic scale in volts against the temperature change of unit 25 in degrees F. Thus it will be seen that as the temperature rises to about 300° F., the voltage output $E_o$ gradually decreases. Over a very short range of temperatures near 300° F., a rapid transition occurs in which the voltage output decreases suddenly by more than a whole order of magnitude, that is, from an order of magnitude greater than $10^{-1}$ volts to an order less than $10^{-2}$ volts. Under temperature increase above about 300° F. the voltage $E_o$ again decreases more gradually. This represents a corresponding decrease in magnitude of resistance presented to current flow by unit 25.

Unit 7 may be substituted for unit 25 in the FIG. 4 circuit and similar test data obtained and plotted according to the procedure outlined for FIG. 3. The result is a curve of the same nature, although having different constituent values. Thus in that case the transition of more than a whole order of magnitude will occur at about 350° F.

A possible explanation of the transition effect is that at the critical temperature a physical transition occurs in the crystal structure of the silver sulfide, silver iodide or the like semiconductor, believed to be an internal solid phase transformation. Variations in pressure on the material such as the packed silver iodide in FIG. 2 have an effect on the temperature at which phase change will occur. Additions may be made of various materials to the silver sulfide or iodide which will also have a like result by affecting their lattice energies.

A feature of the invention is that upon applying a constant voltage to elements such as 7 or 25 they will, in a closed circuit drawing current, suddenly pass more current when their transition values of temperatures are reached. This makes the invention useful in signal sensing circuits, control circuits and the like, particularly in cases wherein current flow during long nonsensing periods should be minimized.

A simple motor-protection application of the invention is schematically illustrated in FIG. 5, wherein is shown a motor circuit C, to which an input coltage $E_i$ is applied. The connected motor is lettered M. The wire electrode 1 or 15, as the case may be, of either of the unit 7 or 25 is connected in the circuit C which supplies the windings of the motor M. The other electrode 5 or 17, as the case may be, is connected to one side of the line C through the respective semiconductor 3 or 19 and to the other side of the line C through the coil L of a relay R operating a control switch S for the motor M. Thus in effect the semiconductor material 3 or 19 is connected in parallel with the motor windings. At less than a predetermined value of current in the coil L the switch S will remain closed, but above this value it will open. The silver wire electrode 1 or 15, as the case may be, is made of such a diameter that its temperature rise approximates the temperature rise of the wire in the motor windings. Thus, for example, when the temperature of the motor windings in response to excess motor current reaches an unacceptable value such as, for example, about 300° F. or about 350° F. depending upon which unit 25 or 7 is used, the resistance of the semiconductor material 19 or 3 will suddenly drop with a concomitant rapid increase in current passing through the relay coil L. This opens the switch S, which may be of the known automatic reset type wherein it automatically recloses upon decrease of current below the transition value, or which may remain open until manually reset. The automatic reset type is schematized in FIG. 5. If desired, heating of the wire 1 or 15 may be made independent of self-heating by current. This may be accomplished by placing unit 7 or 25 in heat-conductive relation to the motor windings, which is feasible, in view of the small sizes in which the units may be designed.

While the structures described have three terminals, they may be connected as two-terminal devices, as by omitting one of the end connections on wire 1 or 15. Or a variable-pressure capsule or unit such as shown in FIG. 6 may be employed wherein 27 indicates a conductive metallic cup forming one electrode and containing the powdered semiconductor 29 such as above described. At 31 is a conductive disc from which extends a terminal stem 33. Stem 33 and disc 31 are slidably arranged in an insulating closure member 35. Disc 35 is held in compressive engagement with material 29. It also holds disc 31 in such compressive engagement. This is accomplished by peripheral crimping 37, disc 31 being slidably countersunk in disc 35. An epoxy sealing compound is indicated at 39. Line wires 41 and 43 are connected as indicated. By varying pressure upon the stem 33, the pressure upon the semiconductive material may be varied, whereby the temperature at which phase change will occur may be varied. This changes the temperature at which the voltage and current transition occurs. A screw such as shown at 45 may be employed for control purposes. Such a device is useful as the sensing element of a room thermostat, having a conventional auxiliary heater wire.

From the above it is apparent that the invention provides for temperature-induced rapid current changes in circuits at definite temperatures. Thus well defined control points may be established in circuitry. It is also apparent that the temperature differential within which control occurs is extremely small, and in fact closely approaches zero value.

It will also be observed that in some circuits drawing sufficient current, self heating of the semiconductor material will advance the time at which the phase change and transition effect will occur.

As is known by those skilled in the art, some resistance devices constructed of materials such as iron have a more or less continuous rate of linear rise in resistance with temperature rise and others have an abrupt increase in resistance in some part of the temperature range. The present device differs in that at some small part of the temperature range to which it may be subjected its resistance decreases abruptly. Thus in application normal current flow for control purposes is small, being greater only during temporary control functions, as in the case of the example described above in relation to FIG. 5.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. An electrical circuit control comprising a unit including a conductive wire core electrode, a spaced conductive sleeve electrode surrounding the wire core electrode, conductive material between the wire core electrode and the sleeve electrode, the material being characterized in that in response to temperature increase over a certain range in which said material remains in a solid phase its resistance changes more abruptly over a portion of said range than elsewhere in said range, and means adapted to heat said material to a temperature value in said range at which said abrupt change in resistance will occur.

2. An electrical circuit control comprising a unit including a conductive wire core electrode, a conductive sleeve electrode surrounding and spaced from the wire core electrode so as to form a tubular space, conductive material in said space between the wire core electrode and the sleeve electrode, each end of said conductive material being longitudinally offset from the adajcent end of said sleeve electrode, the material being characterized in that in response to temperature increase over a certain range in which said conductive material remains in a solid phase its resistance changes more abruptly over a portion of said range than elsewhere in said range, and means for heating said material to a temperature value in said range at which said abrupt change in resistance will occur, said heating means being an electrical apparatus to be protected against overheating.

3. An electrical control circuit as set forth in claim 2 wherein the ends of said conductive material are spaced outwardly in a longitudinal direction from the ends of said conductive sleeve electrode.

4. An electrical control circuit as set forth in claim 2 wherein the ends of said conductive material are spaced inwardly in a longitudinal direction from the ends of said conductive sleeve electrode, said unit further including insulating members located at the ends of said conductive sleeve electrode and holding the conductive material in the sleeve electrode.

5. An electrical circuit control comprising a unit including an elongate conductive wire core electrode, a concentric elongate conductive sleeve electrode surrounding and spaced from the wire core electrode so as to form a tubular space, semiconductive material infilling said space between the electrodes, each end of said conductive material being offset from the adjacent end of said sleeve electrode in a direction along the length of the wire electrode, said material being charactrized in that in response to temperature increase over a certain range in which said material remains in a solid phase its resistance decreases more abruptly over a portion of said range than elsewhere in said range, means adapted to heat said material to a temperature value in said range at which said abrupt decrease in resistance will occur, and control means responsive to said abrupt decrease in said resistance adapted to effect reduction of said temperature below said value, said heating means being an electrical apparatus to be protected against overheating due to abnormal current, and said control means being a relay connected with said apparatus and responsive to an abrupt decrease in said resistance to reduce the current through said apparatus.

References Cited in the file of this patent

UNITED STATES PATENTS

| | | |
|---|---|---|
| 1,210,058 | Fortesque | Dec. 26, 1916 |
| 2,160,823 | Block | June 6, 1939 |
| 2,283,706 | Stimson | May 19, 1942 |
| 2,377,506 | McWhirter | June 5, 1945 |
| 2,936,434 | Postal | May 10, 1960 |

FOREIGN PATENTS

| | | |
|---|---|---|
| 440,392 | Germany | Feb. 7, 1927 |
| 382,565 | Great Britain | Oct. 27, 1932 |
| 735,755 | Great Britain | Mar. 5, 1953 |